(12) United States Patent
Chun et al.

(10) Patent No.: US 9,087,114 B2
(45) Date of Patent: Jul. 21, 2015

(54) SYSTEM AND METHOD FOR MANAGING ELECTRICAL CURRENT IN A PORTABLE COMPUTING DEVICE

(75) Inventors: Christopher Chun, Austin, TX (US); Amy Derbyshire, Boulder, CO (US); Jon J. Anderson, Boulder, CO (US); Christopher Patrick, San Diego, CA (US); Todd Sutton, Del Mar, CA (US); Eric Ian Mikuteit, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 13/428,154

(22) Filed: Mar. 23, 2012

(65) Prior Publication Data

US 2013/0227327 A1    Aug. 29, 2013

Related U.S. Application Data

(60) Provisional application No. 61/602,951, filed on Feb. 24, 2012.

(51) Int. Cl.
| | |
|---|---|
| *G06F 11/30* | (2006.01) |
| *G06F 1/26* | (2006.01) |
| *G06F 1/32* | (2006.01) |

(52) U.S. Cl.
CPC .............. *G06F 11/3058* (2013.01); *G06F 1/26* (2013.01); *G06F 1/324* (2013.01); *G06F 1/3212* (2013.01); *Y02B 60/1217* (2013.01); *Y02B 60/1292* (2013.01)

(58) Field of Classification Search
USPC ................................................ 713/300, 340
IPC ......................................... G06F 1/324,11/3058
See application file for complete search history.

(56) References Cited

U.S. PATENT DOCUMENTS

| | | |
|---|---|---|
| 7,340,623 B2 | 3/2008 | Kato et al. |
| 7,421,291 B2 | 9/2008 | Karaoguz et al. |
| 7,584,376 B2 | 9/2009 | Finkelstein et al. |
| 7,598,702 B2 | 10/2009 | Walrath |
| 7,725,094 B2 | 5/2010 | Chary |

(Continued)

FOREIGN PATENT DOCUMENTS

JP    2008005031 A    1/2008

OTHER PUBLICATIONS

International Search Report and Written Opinion—PCT/US2013/027019—ISA/EPO—Jul. 11, 2013.

*Primary Examiner* — Mohammed Rehman
(74) *Attorney, Agent, or Firm* — Nicholas A. Cole

(57) ABSTRACT

An electrical current ("EC") manager module may assign a plurality of hardware elements of the PCD to one of two groups. The EC manager module may monitor individual electrical current levels of one of the groups as well as calculate an instantaneous electrical current level for the PCD based on a current charge status for the PCD. The EC manager module may then adjust operation of at least one hardware element to keep operation of the PCD below the calculated instantaneous electrical current level for the PCD. The EC manager module may estimate an electrical current level for one of the groups based on requests issued to hardware elements. The EC manager module may also compare the calculated instantaneous electrical current level to the monitored electrical current level. The calculated instantaneous electrical current level may be compared to minimum current levels listed in a table.

36 Claims, 9 Drawing Sheets

(56) References Cited

U.S. PATENT DOCUMENTS

| | | |
|---|---|---|
| 7,934,107 B2 | 4/2011 | Walrath |
| 2004/0247993 A1 | 12/2004 | Johnson et al. |
| 2008/0004063 A1 | 1/2008 | Haapoja et al. |
| 2008/0161071 A1 | 7/2008 | Sherman |
| 2009/0098914 A1* | 4/2009 | Martin-Cocher et al. .... 455/572 |
| 2009/0275355 A1 | 11/2009 | Tan et al. |
| 2010/0174501 A1* | 7/2010 | Myadam ......................... 702/63 |
| 2010/0291963 A1 | 11/2010 | Patel et al. |
| 2011/0264933 A1 | 10/2011 | Forsythe |
| 2012/0007967 A1* | 1/2012 | Kondo et al. ................... 348/54 |
| 2012/0047379 A1 | 2/2012 | Chen et al. |
| 2012/0139753 A1* | 6/2012 | Finlay ........................... 340/905 |
| 2013/0254579 A1 | 9/2013 | Derbyshire |

\* cited by examiner

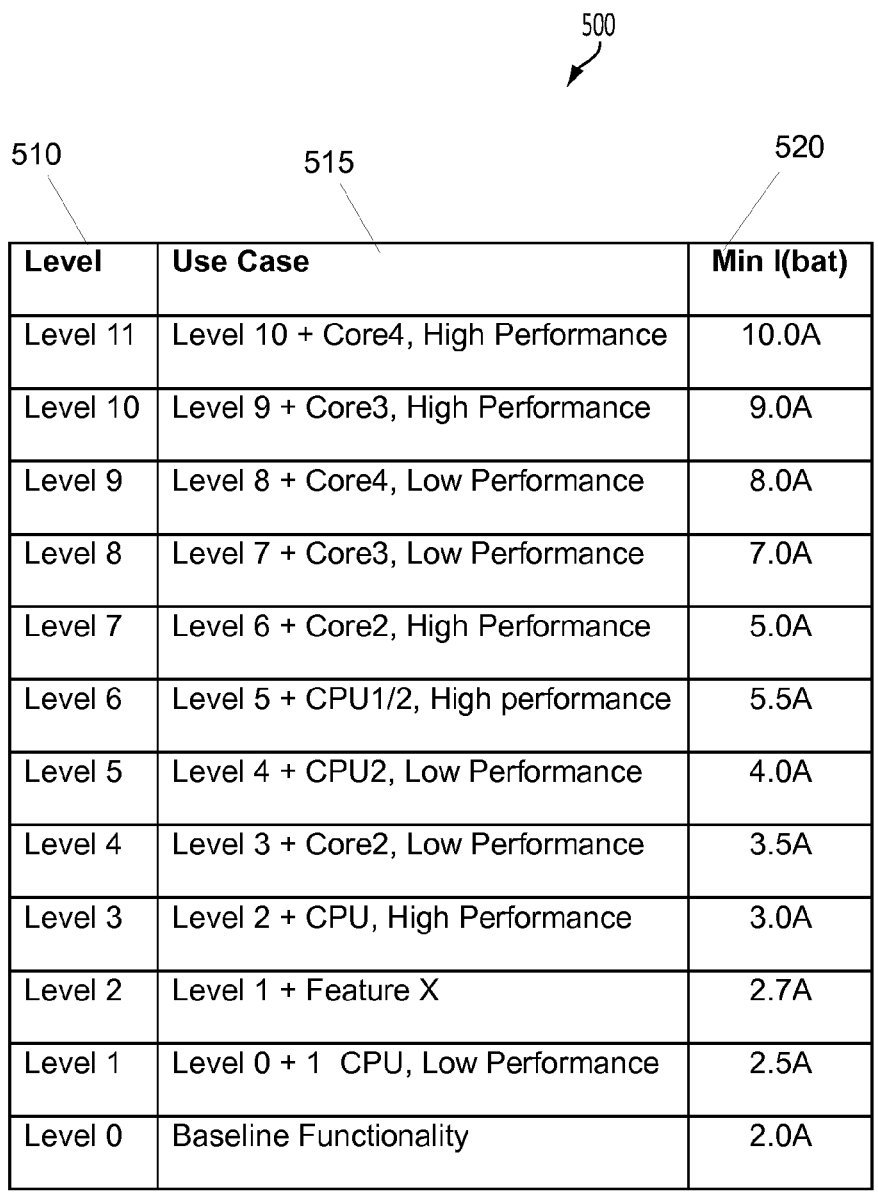

FIG. 5

| Level | Use Case | Min I(bat) |
|---|---|---|
| Level 11 | Level 10 + Core4, High Performance | 10.0A |
| Level 10 | Level 9 + Core3, High Performance | 9.0A |
| Level 9 | Level 8 + Core4, Low Performance | 8.0A |
| Level 8 | Level 7 + Core3, Low Performance | 7.0A |
| Level 7 | Level 6 + Core2, High Performance | 5.0A |
| Level 6 | Level 5 + CPU1/2, High performance | 5.5A |
| Level 5 | Level 4 + CPU2, Low Performance | 4.0A |
| Level 4 | Level 3 + Core2, Low Performance | 3.5A |
| Level 3 | Level 2 + CPU, High Performance | 3.0A |
| Level 2 | Level 1 + Feature X | 2.7A |
| Level 1 | Level 0 + 1 CPU, Low Performance | 2.5A |
| Level 0 | Baseline Functionality | 2.0A |

SYSTEM AND METHOD FOR MANAGING ELECTRICAL CURRENT IN A PORTABLE COMPUTING DEVICE

PRIORITY AND RELATED APPLICATIONS STATEMENT

This patent application claims priority under 35 U.S.C. §119(e) to U.S. Provisional Patent Application Ser. No. 61/602,951, filed on Feb. 24, 2012, and entitled, "SYSTEM AND METHOD FOR MANAGING ELECTRICAL CURRENT IN A PORTABLE COMPUTING DEVICE." The entire contents of which are hereby incorporated by reference.

DESCRIPTION OF THE RELATED ART

Portable computing devices ("PCDs"), like mobile phones, usually have many rich features that are often accessed and run simultaneously. Such features are supported by many hardware elements which consume significant amounts of power. Power in most PCDs is delivered by one or more batteries. In mobile phones, like smart phones, this is usually a single battery having a form factor dictated by the size of the entire mobile phone.

The electrical current draw from the combination of these hardware elements simultaneously often can be excessively high such that the voltage across a single battery may drop significantly when hardware elements are operated simultaneously. Such a significant drop in voltage may directly impact memory. For example, data within memory may become corrupted and may require a system reset in order to correct the problem. Other hardware elements besides memory within a portable computing device may suffer degraded performance when a voltage drop occurs. For example, audio signals supplied to a speaker may be clipped or become choppy due to a voltage drop. For RF modems, a voltage drop may equate to phone calls being dropped.

Voltage drops may occur in complex processor environments. The electrical current draw for PCDs which have multicore processors may be significantly higher compared to portable computing devices which only utilize single core processors.

A scenario in which significant electrical current draw and resulting voltage drops occur may include portable computing devices that support video recording simultaneously with the background light being supplied by light emitting diodes (LEDs). If an instruction intensive application is running on a multicore processor and the user desires to use the camcorder simultaneously with the intensive application while also providing background illumination with LEDs (and while listening to music or providing music through speakers), such a multi-feature situation with conventional portable computing devices may trigger a reset condition for the PCDs as described above. This may be especially true for PCDs powered by a single battery that has a form factor corresponding to the size of the PCD.

Therefore, there is a need in the art for a system and method that manages available electrical current such that PCD functionality is optimized.

SUMMARY OF THE DISCLOSURE

Various embodiments of methods and systems for managing electrical current in a portable computing device ("PCD") are disclosed. Exemplary embodiments include an electrical current ("EC") manager module that may assign a plurality of hardware elements of the PCD to one of two groups. The EC manager module may monitor individual electrical current levels of one of the groups as well as calculate an instantaneous electrical current level for the PCD based on a current charge status for the PCD. The EC manager module may then adjust operation of at least one hardware element to keep operation of the PCD below the calculated instantaneous electrical current level for the PCD. The EC manager module may estimate an electrical current level for one of the groups based on requests issued to hardware elements.

The EC manager module may also compare the calculated instantaneous electrical current level to the monitored electrical current level. The calculated instantaneous electrical current level may be compared to minimum current levels listed in a table. The table may include use cases for the PCD and corresponding minimum electrical current levels. Adjusting operation of at least one hardware element by the EC manager module may include issuing at least one command to the hardware element. The at least one command may comprise one of degree relative to the operation of the hardware element.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 5 provides a PCD current level tracking table that may be part of a database maintained by the EC manager module;

DETAILED DESCRIPTION

Figure 1:
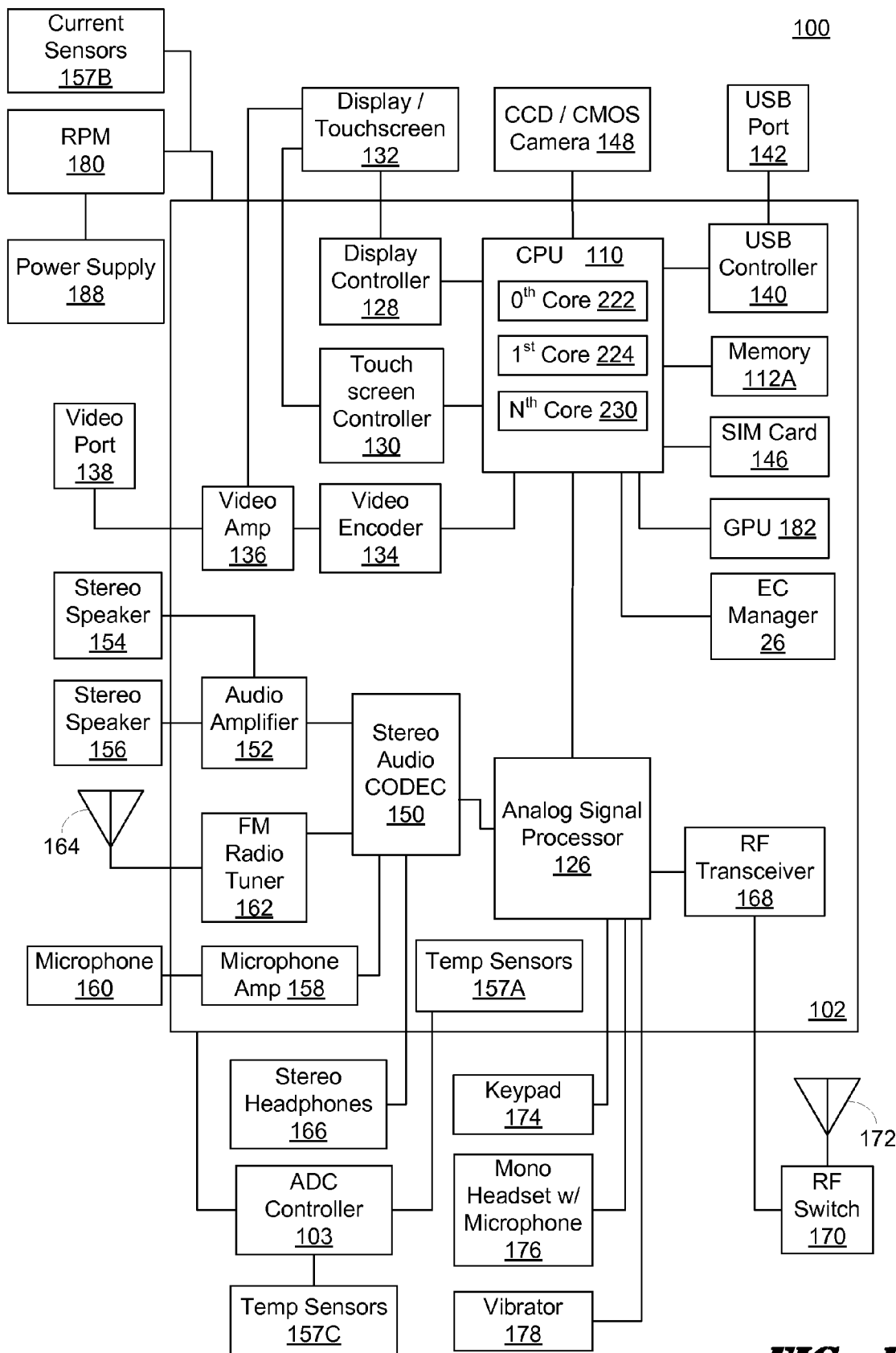
FIG. 1 is a functional block diagram of an exemplary, non-limiting aspect of a PCD in the form of a wireless telephone for implementing methods and systems for managing electrical current within a portable computing device.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," and "chip" are used interchangeably. Moreover, a CPU, DSP, or a chip may be comprised of one or more distinct processing components generally referred to herein as "core(s)."

In this description, the term "call" refers to a request for additional resources and/or functionality in a PCD over and above that which may be running at the time of the call. As such, one of ordinary skill in the art will understand that a call may be the result of a PCD user requesting the PCD to perform some function, provide some service, generate and render some deliverable or the like. Moreover, one of ordinary skill in the art will also understand that a call for a PCD resource may be the result of a given component within the PCD leveraging another component within the PCD to complete a workload task. As a non-limiting example, a user action to open a browser application on a PCD may cause calls for additional resources/components in the PCD not in use at the time of the call such as a modem, a graphical processor and/or a display. One of ordinary skill in the art will understand that allowing a call for a component or resource may increase battery demand within a PCD.

In this description, it will be understood that the terms "thermal" and "thermal energy" may be used in association with a device or component capable of generating or dissipating energy that may be measured in units of "temperature." Consequently, it will be further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load" and "process workload" are used interchangeably and generally directed toward the processing burden, or percentage of processing burden, associated with a given processing component in a given embodiment. Further to that which is defined above, a "processing component" or "thermal aggressor" may be, but is not limited to, a central processing unit, a graphical processing unit, a core, a main core, a sub-core, a processing area, a hardware engine, etc. or any component residing within, or external to, an integrated circuit within a portable computing device.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

An electrical current ("EC") manager module of a PCD, such as a mobile phone, may be embodied in software and/or hardware (or both). The EC manager module may track the state of charge for the battery of the PCD. As understood by one of ordinary skill the art, a battery manifests different characteristics over time while the battery is discharging. Further, the impedance of a battery may change with temperature. The EC manager module may monitor the state of charge of the battery of the portable computing device as well as the impedance of the battery at a given instant so that it can compute the maximum electrical current that a battery may support. The EC manager module may determine the maximum electrical current "budget" that can be "spent" or used by a portable computing device. The EC manager module may also track conditions when the portable computing device and its battery are receiving energy from a charger.

The EC manager module may track the state of electrical current draw from all active hardware components of a portable computing device. In other exemplary embodiments, the EC manager module may assign "high" draw electrical current hardware components to a first group and assign "low" draw electrical current hardware components to a second group. According to this exemplary embodiment, the EC manager module may monitor each hardware component of the first group individually while it may assign an electrical current budget to the second group of hardware components and not track the individual electrical current draws of the hardware components in the second group. Stated differently, the EC manager module may allocate electrical current draw margins to the hardware components of the second group without tracking the individual states of each hardware component in this second group.

The EC manager module may set maximum electrical current draws for certain groups of hardware. The EC manager module may communicate one or more electrical current levels at which a particular hardware device may operate. The EC manager module may communicate a range of levels to a particular hardware device in which each level may be associated with predefined operations that may be specific to the hardware device.

For example, the EC manager module may communicate to a particular hardware device that it should switch from a high electrical current level of operation to a medium electrical current level of operation. The terms "high" and "medium" communicated by the EC manager module may be associated with specific operational characteristics of the hardware. In this scenario, the instruction of changing from a "high" level of operation to a "medium" level of operation from the EC manager module to an exemplary device, like a processor, may mean that the processor needs to dial back or lower its clock frequency.

The lowering of the clock frequency may effectively lower the electrical current draw of the processor. One of ordinary skill in the art recognizes that the messages communicated from the EC manager module to the hardware devices are not limited to the words low, medium or high. Other level designations may include numbers like level 1, level 2, or level 3, or alpha numeric codes, etc. The EC manager module may maintain a table that tracks predefined numerical levels, use cases, and predefined electrical current levels expressed in amperes.

Referring now to FIG. 1, this figure is a functional block diagram illustrating an exemplary embodiment of a portable computing device ("PCD") 100. An electrical current ("EC") manager module 26 within PCD 100 may leverage knowledge of individual hardware elements associated with various software applications in the PCD 100 to manage electrical current. Advantageously, by monitoring the specific electrical current of a hardware element or a plurality of hardware elements, the EC manager module 26 may apply electrical current load management with a fine grained approach which, when necessary, prioritizes components and their associated functions in such a way that the operation of the PCD 100 optimized.

As can be seen in the exemplary illustration of FIG. 1, a resource power manager ("RPM") 180 monitors and controls power supplied by a battery 188 for hardware elements residing within the integrated circuit ("IC") 102. One or more electrical current sensors 157B are configured to monitor power rails (not illustrated) and generate a signal indicative of electrical current consumption by the particular component(s) associated with power rails (not illustrated) which feed each of the hardware elements within IC 102. One or more electrical current sensors 157B may be positioned on the IC 102 and/or adjacent to the IC 102.

It is envisioned that the electrical current sensors 157B may be configured to monitor electrical current and be of a type such as, but not limited to, a Hall effect type for measuring the electromagnetic field generated by electrical current flowing through a power rail, a shunt resistor current measurement type for calculating electrical current from voltage drop measured across a resistor in the power rail, or any type known to one of ordinary skill in the art. As such, while the particular design, type or configuration of a electrical current sensor 157B that may be used in an embodiment of the systems and methods may be novel in, and of, itself, the systems and methods are not limited to any particular type of electrical current sensor 157B.

Other sensors, such as temperature sensors 157A and 157C may be configured for measuring temperature at or near a processing component, the measurement of which may also be used to deduce power consumption by a given component.

As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the EC manager module 26 may be responsible for monitoring electrical current within PCD 100, predicting impacts on battery loads and applying electrical current load management techniques to help the PCD 100 optimize its power supply and maintain a high level of functionality.

The EC manager module 26 communicates with multiple operational sensors (e.g., electrical current sensors 157B, temperature sensors 157A,C, and hardware elements) distributed throughout the on-chip system 102 and with the CPU 110 of the PCD 100. In some exemplary embodiments, the EC manager module 26 may also monitor electrical current sensors 157B for current consumption rates uniquely associated with the cores 222, 224, 230 and transmit the current consumption data to a database (which may reside in memory 112). The EC manager module 26 may identify use case conditions of the PCD 100 that may warrant application of one or more electrical current load management techniques to specific hardware elements within chip 102.

As illustrated in FIG. 1, a display controller 128 and a touch screen controller 128 are coupled to the digital signal processor 110. A touch screen display 132 external to the on-chip system 102 is coupled to the display controller 128 and the touch screen controller 128. The EC manager module 26 may monitor workload queues for the cores 222, 224, 230, for example, and work with the RPM 180 to manage power provided to the cores from power supply 188. The EC manager module 26 may monitor electrical current measurements on power rails from the RPM 180 to components of the on-chip system 102 and calculate present levels of electrical draw on the power supply 188, that may comprise a single battery and/or an electrical charger for the battery. Advantageously, by quantifying present levels of electrical current loads the EC manager module 26 may predict electrical current drawn on the battery 188 resulting from calls for additional functionality/workloads from one or more hardware elements within PCD 100.

PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 1, a universal serial bus ("USB") controller 140 is coupled to the CPU 110. Also, a USB port 142 is coupled to the USB controller 140. A memory 112A and a subscriber identity module (SIM) card 146 may also be coupled to the CPU 110. Further, as shown in FIG. 1, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further illustrates that a radio frequency ("RF") transceiver 168 may be coupled to the analog signal processor 126. An RF switch 170 may be coupled to the RF transceiver 168 and an RF antenna 172. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 188, for example a battery and/or an electrical charger in combination with the battery, is coupled to the on-chip system 102 through RPM 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157C may be employed without departing from the scope of the invention.

The thermal sensors 157A, 157C, in addition to being controlled and monitored by an ADC controller 103, may also be controlled and monitored by one or more EC manager module(s) 26. The EC manager module 26 may comprise software which is executed by the CPU 110. The EC manager module 26 may comprise one or more modules. However, the EC manager module(s) 26 may also be formed from hardware and/or firmware without departing from the scope of this disclosure. The EC manager module(s) 26 may be responsible for monitoring and applying electrical current load policies that include one or more electrical current load management techniques that may help a PCD 100 avoid overburdening its power supply 188 while maintaining a high level of functionality and user experience.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the RPM 180 and the thermal sensors 157C are external to the on-chip system 102. However, it should be understood that the EC manager module 26 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more EC manager module(s) 26. These instructions that form the EC manager module(s) 26 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 2:
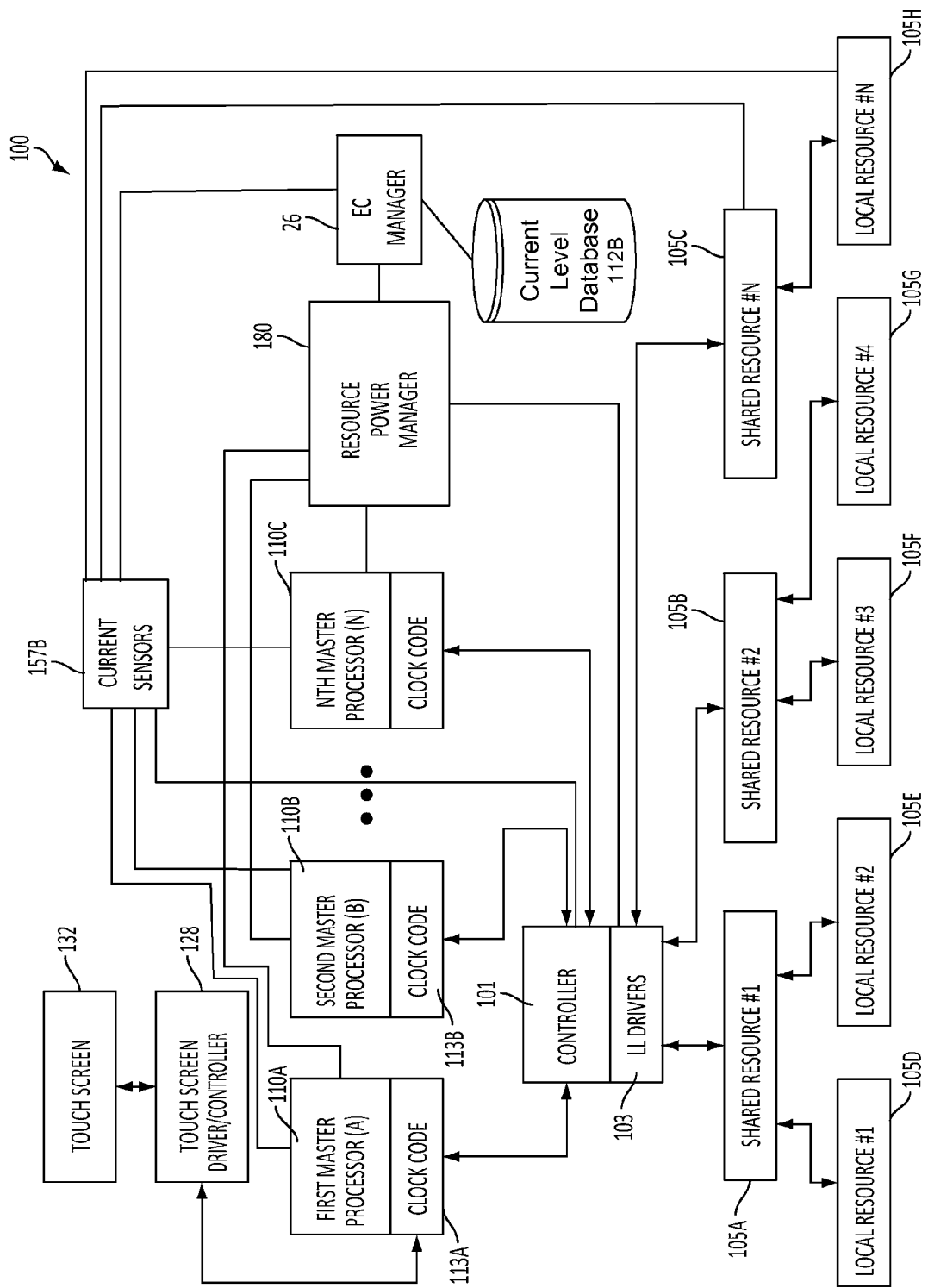
FIG. 2 is a functional block diagram illustrating relationships among the EC manager, controller, a resource power manager, master processors, low-level drivers, shared resources, and local resources.

FIG. 2 is a functional block diagram illustrating relationships among a controller 101, resource power manager 180, master processors 110, 126, low-level drivers 103, shared resources 105A-C, and local resources 105D-H that are part of a PCD 100. FIG. 2 also illustrates how the touchscreen 132 may be coupled to the touchscreen driver/controller 128. The touchscreen driver/controller 128 may be coupled to clock code 113A of a first master processor 110A.

In the exemplary embodiment shown in FIG. 2, the first master processor 110A may be coupled to the resource power manager ("RPM") 180 and the controller 101. The RPM 180 may be responsible for controlling power to the hardware elements such as processors 110A-110C. The RPM 180 may also control power to each resource 105 through its control of low level drivers 103. The RPM 180 may execute or run the EC manager module 26 when it is embodied as software. Alternatively, the RPM 180 may comprise the EC manager module 26 when it is embodied as hardware and/or software or both.

The EC manager module 26 manages and maintains a database 112B. Exemplary data stored in the database may include, but is not limited to, a table that tracks predefined numerical levels, use cases, and predefined electrical current levels expressed in amperes as will be described in further detail below in connection with FIG. 5. With the database 112B, the EC manager module 26 may monitor and track instantaneous electrical current levels of the battery 188 and/or any chargers used to replenish the battery 188 with various current sensors 157B. The EC manager module 26 may issue commands through the RPM 180 to control current levels of the various hardware elements illustrated such as the processors 110 and resources 105 as will be described in further detail below.

The controller 101 may be coupled to the clock code 113A of the first master processor 110A. The controller 101 may comprise one or more low-level drivers 103. The one or more low-level drivers 103 may be responsible for communicating with one or more shared resources 105A-C. Shared resources 105A-C may comprise any type of device that supports tasks or functions of a master processor 110. Shared resources 105A-C may include devices such as clocks of other processors as well as single function elements like graphical processors, decoders, and the like.

The shared resources 105A-C may be coupled to one or more local resources 105D-H. The one or more local resources 105D-H may be similar to the shared resources 105A-C in that they may comprise any type of device that supports or aids tasks or functions of a master processor 110. Local resources 105D-H may include devices such as clocks of other processors as well as single function elements like graphical processors, decoders, and the like. The local resources 105D-H may comprise leaf nodes. Leaf nodes are understood by one of ordinary skill in the art as local resources 105D-H that usually do not refer or include other dependent resources 105.

The controller 101 may be responsible for managing requests that are issued from the one or more master processors 110, 126. For example, the controller 101 may manage a request that originates from the first master processor 110A. The first master processor 110A may issue this request in response to an operator manipulating the touchscreen 132. The touchscreen 132 may issue signals to the touchscreen driver/controller 128. The touchscreen driver/controller 128 may in turn issue signals to the clock code 113A of the first master processor 110A.

The controller 101 may also be responsible for managing the sleep states for a particular processor 110. Prior to entering a sleep state, a processor 110 will provide information for managing sleep states. Information for managing sleep states includes the entry into and exiting from a sleep state.

Figure 3:
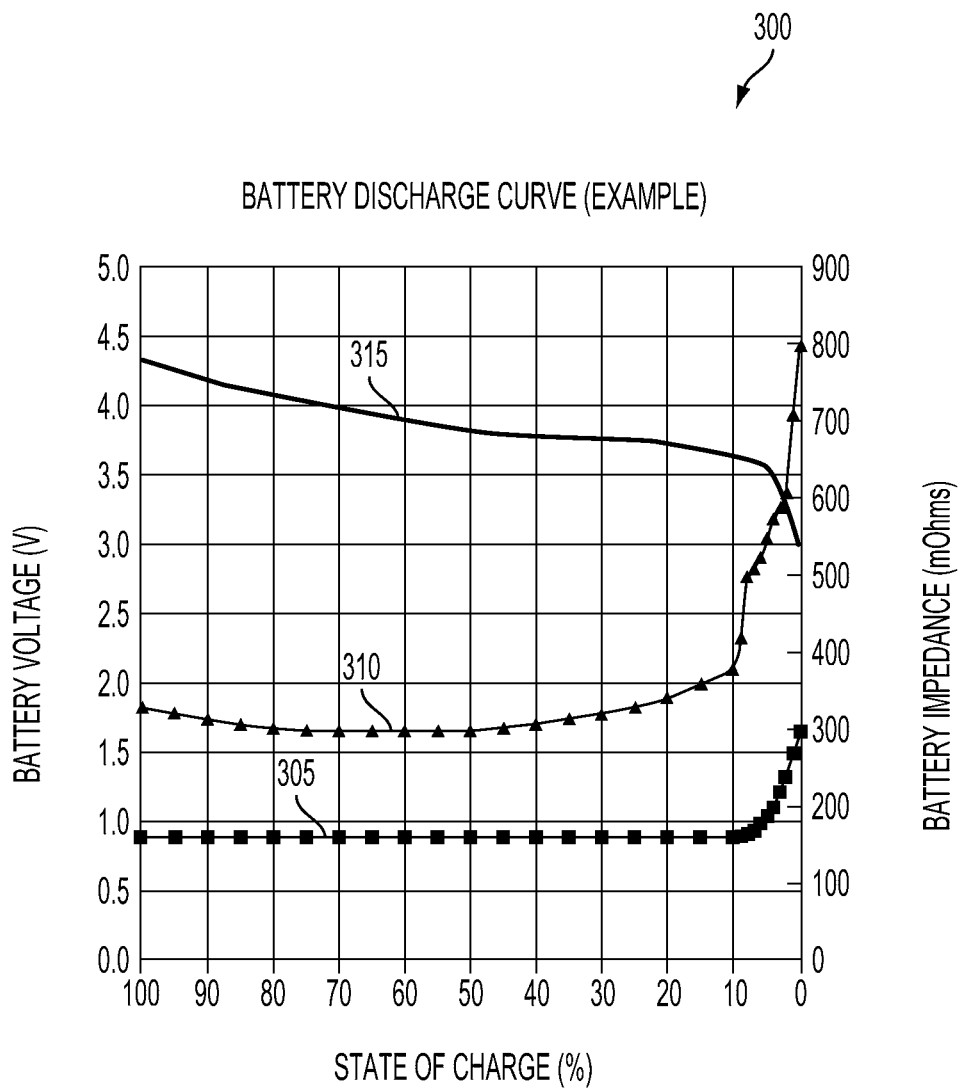
FIG. 3 is a graph which illustrates the state of charge of a battery of a portable computing device plotted along the X-axis versus battery voltage (in Volts) plotted a long a first y-axis and battery impedance (milliohms) plotted along a second y-axis.

FIG. 3 is a graph 300 which illustrates the state of charge of a battery 188 of a portable computing device 100 plotted along the X-axis versus battery voltage (in Volts) plotted a long a first y-axis and battery impedance (milliohms) plotted along a second y-axis. The first curve 305 of graph 300 tracks the state of charge of a battery 188 of a portable computing device 100 operating at 25° C.

Meanwhile, the second curve 310 of graph 300 corresponds with the same battery 188 of the portable computing device operating at 0° C. The second curve 310 illustrates how battery impedance increases with decreases in temperature. The third curve 315 tracks the open circuit voltage of the Battery 188. By tracking the temperature of a portable computing device 100, the EC manager module 26 will be able to accurately calculate the instantaneous electrical current available from the battery 188 since the impedance of the battery 188 is a function of temperature. The EC manager module 26 may store the information contained in graph 300 in its database 112B.

Figure 4:
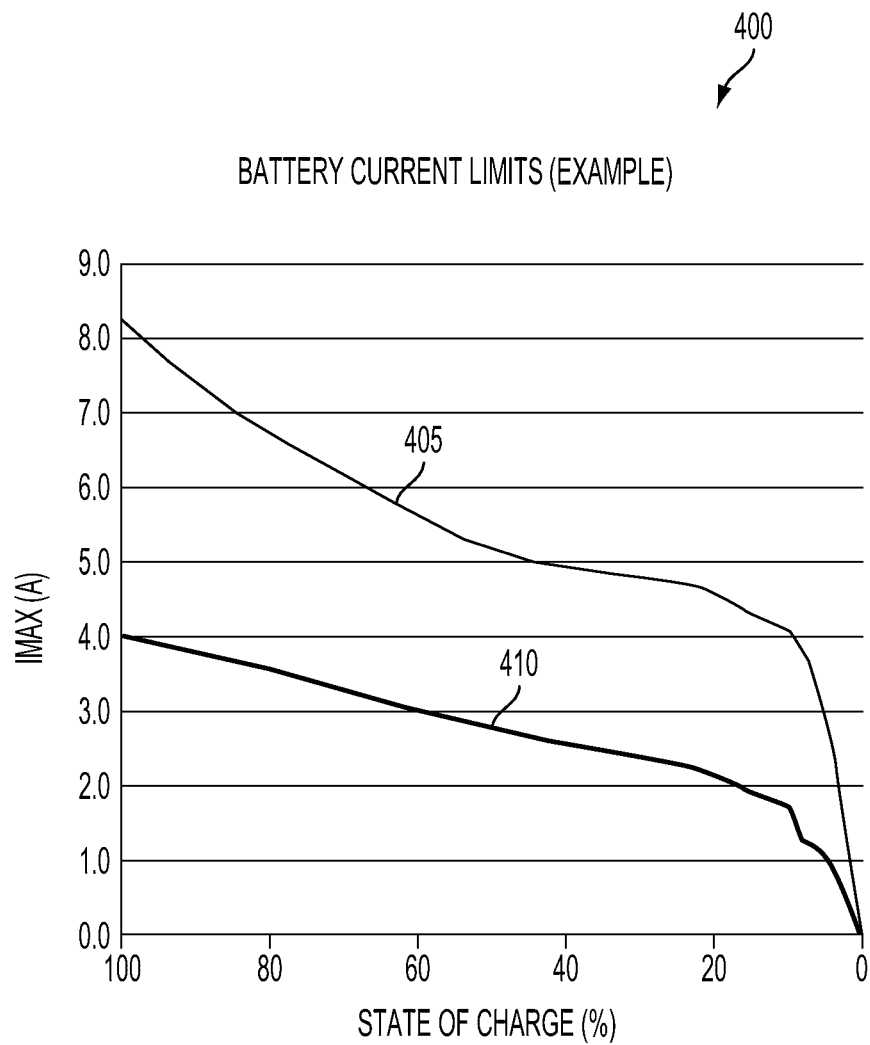
FIG. 4 is a graph which illustrates the state of charge of a battery of a portable computing device projected along the X-axis against achievable current maximums projected on the Y-axis.

FIG. 4 is a graph 400 which illustrates the state of charge of a battery 188 of a portable computing device 100 projected along the X-axis against achievable current maximums projected on the Y-axis. As understood by one of ordinary skill the art, the impedance of a battery 188 may change in response to changes in temperature as discussed above in connection with FIG. 3.

The first curve 405 of graph 400 tracks electrical current associated with a battery 188 operating at a first temperature while the second curve 410 tracks electrical current associated with the same battery 188 operating at a second temperature. In the exemplary embodiment illustrated in FIG. 4, the first temperature comprises 25° C. while the second temperature comprises 0° C.

At higher temperatures, a battery 188 may support more current as indicated by the first curve 405. Meanwhile, at lower temperatures, the impedance for the same battery 188 increases, which means that the same battery 188 will support less current as indicated by the second curve 410. This information about the electrical current supported by the battery 188 may be monitored and tracked by the EC manager module 26 with its database 112B as will be described in further detail below in connection with FIGS. 5-6.

FIG. 5 provides a PCD current level tracking table 500 that may be part of a database 112B maintained by the EC manager module 26. The table 500 may comprise predefined numerical levels 510 listed in a first column, PCD use cases 515 in the second column, and predefined electrical current levels 520 expressed in Amperes in the third column. However, one of ordinary skill the art recognizes that other data as well as different order or sequences of the data tracked in table 500 may be employed without departing from the scope of the disclosure described herein.

Each numerical level 510 in the table 500 may be associated with a particular PCD use case 515 that relates to functions, features, and/or operations of specific hardware elements within the portable computing device 100. For example, level 0 (zero) may be associated with a baseline functionality. Meanwhile, level 1 may include the functionality of level 0 in addition to a CPU operating at a "low performance." Level 2 may include the functions/features/ operations of level 1 in addition to a Feature X, where X may be specified by the operator of the PCD 100 and/or manufacturer of the PCD 100.

The minimum current level 520 assigned to each use case 515A for levels 0, 1, and 2 are 2.0 amps, 2.5 amps, and 2.7 amps respectively. And so-on. The minimum current level 520 for each row/level 510 of table 500 may be determined by the EC manager 26, the manufacturer of the PCD 100, and/or the operator of the PCD 100.

The EC manager module 26 may determine the instant current maximum for the portable computing device 100 and then communicate operational level messages to its various hardware devices under its control. For example, at the level 1 row of table 500 the EC manager module 26 may communicate to a multicore processor 110 that it may operate one of its cores, like zero core 222 of FIG. 1, at a low level which translates to the non-turbo mode expressed in table 510.

The EC manager module 26 may easily produce the data listed in table 510 and/or the data may be calculated under laboratory conditions and then loaded into memory 112A of the portable computing device 100 so that the EC manager module 26 may access the table 510 with this pre-loaded data. Whether or not the EC manager module 26 may produce the data listed in table 510 depends on the amount and the location of current sensors 157B provided within the portable computing device 100. In some instances, too many electrical current sensors 157B may be cost prohibitive as understood by one of ordinary skill in the art. If electrical current sensors 157B are provided, the EC manager module 26 may communicate to receive data from the sensors 157B.

Figure 6:
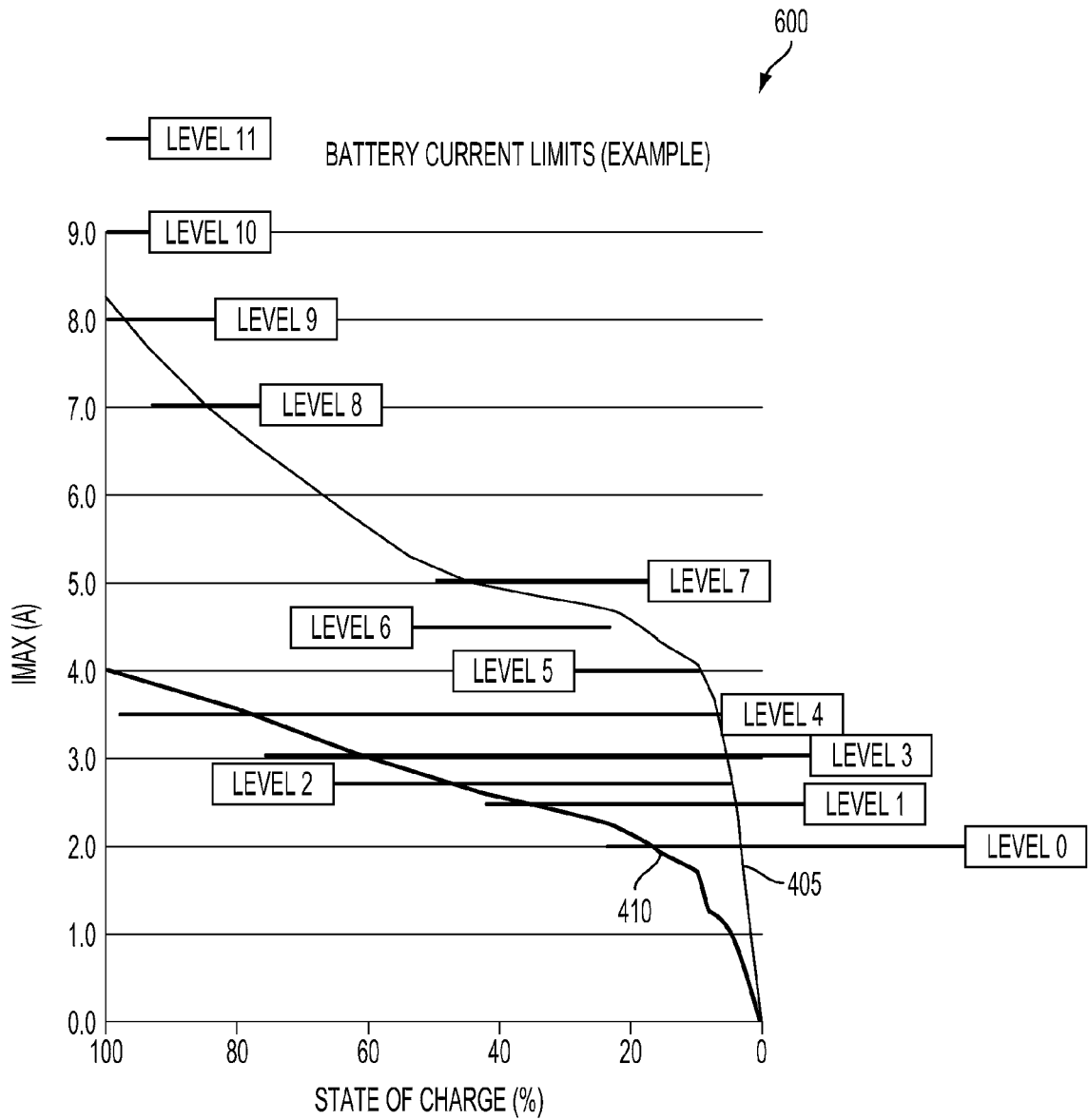
FIG. 6 is a graph which illustrates the state of charge of a battery of a portable computing device projected along the X-axis against achievable current maximums projected on the Y-axis along with electrical current levels referenced in the table of FIG. 5.

FIG. 6 is a graph 600 which illustrates the state of charge of a battery 188 of a portable computing device projected along the X-axis against achievable current maximums projected on the Y-axis. The graph 600 of FIG. 6 also comprises the electrical current levels referenced in table 500 of FIG. 5.

Graph 600 is very similar to graph 400 in that it also contains the first curve 405 which tracks data associated with the battery 188 operating at a first temperature. Graph 400 also has the second curve 410 of FIG. 4 which tracks data associated with the same battery 188 operating at a second temperature. In the exemplary embodiment illustrated in FIG. 6, the first temperature comprises 25° C. while the second temperature comprises 0° C.

The graph 600 illustrates how the highest level for a battery 188 operating at the second temperature of 0° C. tracked by the second curve may only reach level 4. This level 4 of graph 600 corresponds with level 4 of table 500 and FIG. 5.

The EC manager module 26 computes instantaneous electrical current using ohms law which is embodied in equation 1 (EQ1) provided below:

$$I(max) = (Ocv - Vmin)/Rbat \quad (EQ1)$$

wherein I(max) is the instantaneous maximum electrical current; Ocv is the open circuit voltage of the battery 188, which is a function of the state of charge ("SoC") of the battery 188; Vmin is the minimum voltage of the battery 188 needed to support operation of the PCD 100 (i.e., if the battery voltage drops below this level, a voltage regulator on the PCD power grid may begin to operate outside of specification leading to a reset of the PCD 100); and Rbat is the impedance of the battery 188.

The EC manager module 26 computes what maximum current (Imax) may be supported by the portable computing device 100 based on the characteristics of the battery 188. Most battery manufacturers will provide some characteristics about the battery 188 and how they may change across operating states, like how impedance of the battery 188 may change over time due to various factors such as temperature. This information may be used by the EC manager module 26 to calculate the state of charge at a particular instant in time for the portable computing device 100.

From the state of charge (Soc) parameter, the EC manager module 26 may calculate the open voltage (Ocv) which can be supported by the battery 188. Also from the state of charge and the battery characteristics, the maximum current (Imax) that may be supported at any given instant of time may be calculated by the EC manager module 26. Based on the calculated electrical current maximum (Imax), the EC manager module 26 may issue commands to throttle hardware elements accordingly.

Referring back to table 500 FIG. 5, the EC manager module 26 is calculating the present electrical current maximum (Imax) and comparing its calculated Imax value to the minimum current level listed in column 520 of table 500 (which levels are also plotted in graph 600 of FIG. 6). Based on the user scenarios listed for a particular level, the EC manager module 26 will activate and/or deactivate hardware elements corresponding to the user scenarios listed in table 500 for a particular operating level.

As noted previously, the EC manager module 26 may reside or be executed by the resource power manager (RPM) 180 as illustrated in FIG. 2. The RPM 180 is typically embodied by an ARM processor as understood by one of ordinary skill in the art. If not residing in an ARM, the EC manager module 26 may reside within or be executed by a processor 110 which does not usually enter into a sleep state. However, according to other exemplary embodiments, it is possible that the EC manager module may be executed by an ordinary central processing unit 110 or an applications processor 110 that on occasion may enter into a sleep state, but such embodiments would likely be less preferred.

Figure 7:
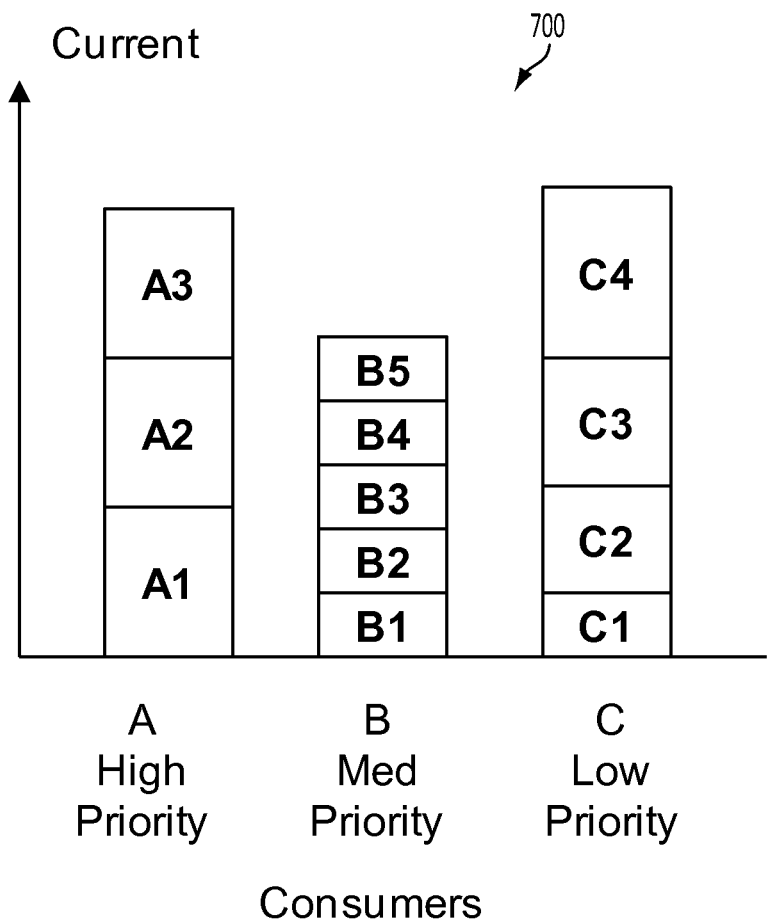
FIG. 7 is a bar chart 700 that illustrates at least three different types of electrical consumers that may be categorized within a portable computing device by the EC manager module.

Referring now to FIG. 7, this figure comprises a bar chart 700 that illustrates at least three different types of electrical consumers that may be categorized within a portable computing device 100 by the EC manager module 26. A first set of electrical consumers may be designated with a high priority such as those designated with the letter "A" as illustrated in FIG. 7.

A second set of electrical consumers may be designated with a medium priority such as with the letter "B." A third set of electrical consumers may be designated with a low priority such as with the letter "C."

Each priority may be assigned a particular weighting which may be represented mathematically. Further, one of ordinary skill in the art recognizes that the number of sets or categories of electrical consumers within a portable computing device 100 may be increased or decreased without departing from the scope of the disclosure described herein.

The functions/features/operations assigned to a particular set or category may be adjusted depending upon desired priorities by the operator of the portable computing device 100. For example, an operator of the portable computing device 100 who is primarily interested in recording video and less interested in gaming may assign video recording with a higher priority relative to gaming, which may be assigned a lower priority as understood by one of ordinary skill in the art.

According to one exemplary embodiment, the level "A" type of electrical consumers may correspond to different levels for supporting voice calls in a portable computing device 100. The lowest level (A1) within this type of electrical consumer may comprise supporting voice calls in an emergency 911 ("E911") situation. The highest level within this set or class of priority may comprise level A3 in which voice and data may be transmitted simultaneously.

Meanwhile, at the next level within category "A" hardware elements, such as the level A2, only voice calls may be supported and not data as understood by one of ordinary skill in the art. And as noted above, the A1 level may only be limited to E911 type calls.

The medium priority functions and/or features assigned to the letter "B" category may comprise video gaming in which performance may be adjusted without degrading perceivable quality of service ("QoS") by the user. For example, response time, updates, and how things are encoded may be may be reduced without any perceivable degradations in QoS.

The lowest priority functions and/or features assigned to the letter "C" category may comprise operations such as a camcorder. Performance of the camcorder may be adjusted such that the number of frames per second may be reduced during recording in order to conserve electrical current.

Figure 8:
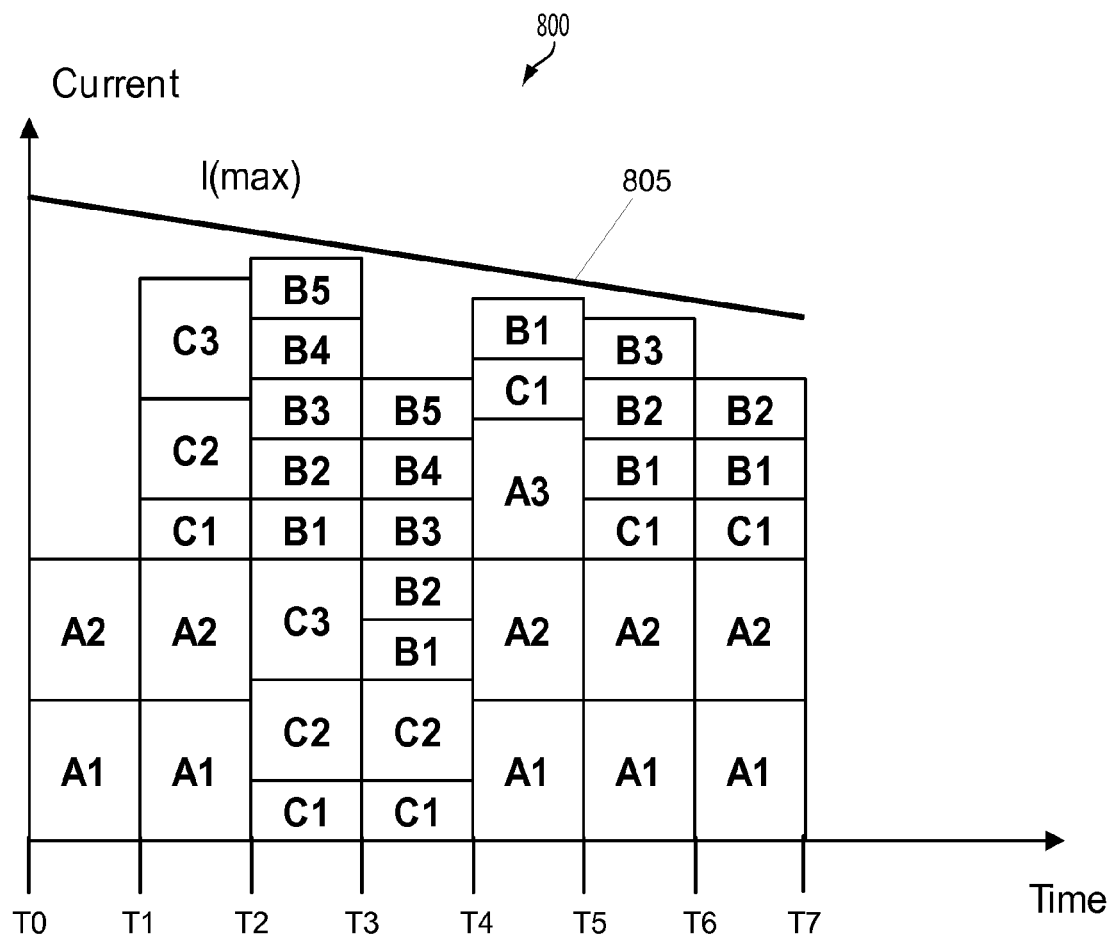
FIG. 8 is a graph 800 which illustrates instantaneous current plotted on the y-axis versus time on the x-axis in addition to present consumption of categories of electrical consumers illustrated in FIG. 7.

Referring now to FIG. 8, this figure has a graph 800 which illustrates instantaneous current plotted on the y-axis versus time on the x-axis in addition to present consumption of categories of electrical consumers illustrated in FIG. 7. Graph 800 illustrates how electrical current within a portable computing device 100 is consumed over time.

Between time 0 in time T1, an operator of the portable computing device 100 may power up the device and initiate a voice phone call as indicated by current levels A1 plus A2. The electrical current levels represented by A1 plus A2 fall well below the instantaneous current maximum tracked by curve 805 of FIG. 8.

Next, between times T1 and T2, the voice call as represented by electrical current levels A1 plus A2 may continue while current levels C1 plus C2 plus C3 may be added to correspond with the operator of the portable computing device 100 desiring to power up the camcorder so that video may be recorded while he or she is conducting the telephone call. Since the electrical current level of A1 plus A2 plus C1 plus C2 plus C3 fall below the instantaneous current maximum corresponding to curve 805, then these features/functions may be permitted to function by the EC manager module 26 after the EC manager module 26 determines that these features/functions do not exceed the present electrical current level tracked by curve 805.

Between times T2 and T3, the voice call has been terminated, therefore, blocks A1 and A2 representing a voice call have been removed from the graph 800. Meanwhile, during times T2 and T3, the operator of the portable computing device may have continued with the video recording as represented by electrical current level blocks C1 plus C2 plus C3 while initiating a video game application program that is represented by the electrical current levels of B1 through B5.

Since the sum of C1 through C3 and B1 through B5 electrical current levels is less than the present instantaneous present electrical current level represented by curve 805, then the EC manager module 26 may permit these functions/features to operate without any conditions (freely). Between times T3 and T4, as the instantaneous electrical current level continues to drop as represented by curve 805, then the EC manager module 26 may need to impose conditions or degrade the quality of service for particular functions and/or features in order to conserve electrical current.

For example, between times T3 and T4, while the operator of the portable computing device 100 continues to record with the camcorder features/functions, the EC manager module 26 may have reduced the recording level of the camcorder in which current level block C3 has been removed. According to this particular embodiment, the EC manager module 26 may have instructed the camcorder to reduce the number of frames it was recording per second.

Meanwhile, during the same time window between time T3 and T4, the video gaming feature is maintained at its previous current levels as represented by electrical current level blocks B1 through B5. As noted previously, video gaming as described in connection with FIG. 7 was assigned a higher priority at level "B" relative to level "C" category of the camcorder function/feature.

Next, between times T4 and T5, the operator of the portable computing device 100 decides to initiate a voice and data transmission is represented by electrical current level blocks A1 through A3. Since voice and data transmissions have a higher priority at the "A" level relative to the "B" level of video gaming and "C" level of camcorder recording, then the electrical current levels for the video gaming and the camcorder recording are reduced by the EC manager module 26 during this time period.

This downward change during the time period between time T4 and T5 is represented by blocks C1 and B1 which were changed from electrical current levels B1-B5 and C1-C2 during time period T3 and T4, respectively. The electrical current levels for the "B" and "C" category functions/features were changed during time period T4 and T5 in a downward manner in order to accommodate the higher priority voice and data transmissions as represented by electrical current level blocks A1-A3. The management by the EC manager module 26 of the functions and features of the portable computing device 100 continues similarly for time periods from T5 through T7 as understood by one of ordinary skill the art.

Figure 9:
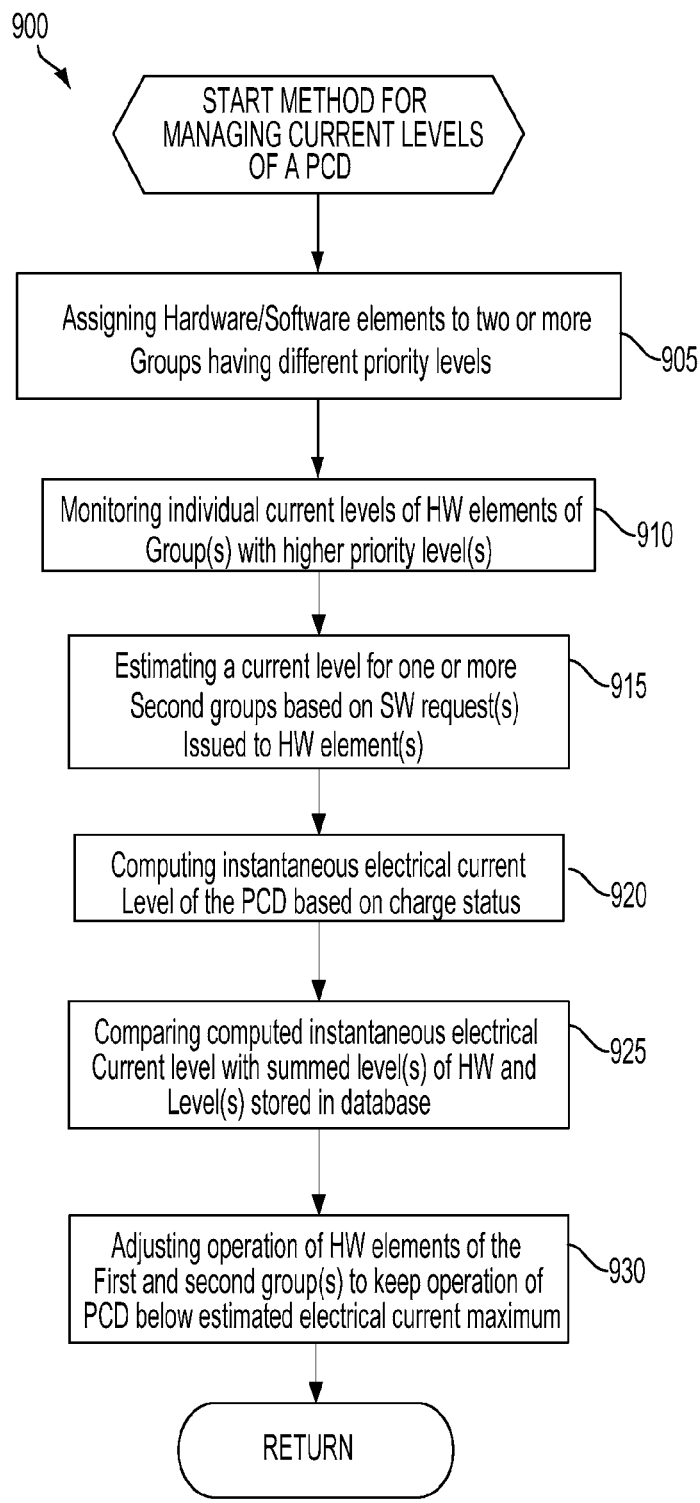
FIG. 9 is a logical flowchart illustrating a method for managing electrical current levels within a portable computing device.

FIG. 9 is a logical flowchart illustrating a method 900 for managing electrical current levels within a portable computing device 100. Block 905 is the first step of method 900. In block 905, the EC manager module 26 may assign hardware and/or software elements to two or more groups in which each group may have its respective priority level. For example, as discussed above in connection with FIG. 7, the EC manager module 26 may assign voice calls according to a level "A" priority while gaming functions are assigned to a level "B" priority in which the level "B" priority is lower relative to the level "A" priority and so on. The EC manager module 26 may perform these assignments automatically and adjust these assignments periodically. Alternatively, the EC manager module 26 may be provided with these assignments from preloaded memory 112A created at the factory for the PCD 100. In other exemplary embodiments, an operator of the portable computing device 100 may be provided with options for selecting how hardware and/or software elements are assigned priority by the EC manager module 26.

Next, in block 910, the EC manager module 26 may monitor individual electrical current levels of hardware elements assigned to higher priority levels. For example, as described above in connection with FIG. 7, the EC manager module 26 may monitor the current levels of all hardware elements assigned to the highest priority level "A" category. Meanwhile, the EC manager module 26 may only track an estimated amount of electrical current levels for those hardware elements assigned to the lower categories, such as the level "B" category and the level "C" category. The EC manager module 26 is not limited to monitoring individual hardware elements of a single category/priority/class. The EC manager module 26 is capable of monitoring electrical current levels of individual hardware elements for all categories/priorities as well as various combinations of categories/priorities.

Next, in block 915, the EC manager module 26 may estimate an electrical current level for one or more second groups based on software requests issued to various hardware elements. In other words, the EC manager module 26 may estimate electrical current levels for those hardware elements of the PCD 100 which may be assigned to lower priority groups, such as the "B" and "C" category groups illustrated in FIG. 7 and described above.

In block 920, the EC manager module 26 may calculate the instantaneous electrical current level of the PCD 100 based on its current charge status. In this block 920, the EC manager module 26 may be utilizing the data illustrated in graph 600 of FIG. 6. The EC manager module 26 may determine the current operating temperature of the PCD 100 and then utilize charge data corresponding to the appropriate curve 405, 410. The EC manager module 26 also utilizes EQ1 described above once it has obtained data for all of the variables needed to solve this EQ1 for instantaneous electrical current levels.

In block 925, the EC manager module 26 may compare the calculated instantaneous electrical current level from block 920 with the monitored electrical current levels from block 910 and the estimated electrical current levels from block 915. All of these electrical current levels may be stored in the database 112B. Specifically, in this block 925, the EC manager module 26 compares the calculated instantaneous electrical current level with the minimum current level column 520 and the operation level column 510 tabulated in table 500 of FIG. 5. Based on the use cases listed in column 515, the EC manager module 26 then reviews the electrical current levels of the various hardware elements of the various groups.

In block 930, the EC manager module 26 may adjust operation of the hardware elements of the first and second groups in order to keep operation of the PCD 100 below the estimated electoral current maximum calculated in block 920. The EC manager module 26 may then issue commands to various hardware elements through the resource power manager 180 that correspond with the use cases listed in column 515 of table 500. The hardware commands issued by the EC manager module 26 may include, but are not limited to, those such as "high," "low," "medium," "level 1," "level 2," "level 3, "turbo," "non-turbo," etc. etc. Such commands may be characterized as ones of degree relative to the operation of the hardware element. The process 900 then returns.

As understood by one of ordinary skill in the art, the EC manager 26 may adjust the relative electrical current level of the PCD 100 up or down. All of the examples described above show cases where the battery 188 is draining. If the PCD 100 is connected to a charger or other type of power device, then the EC manager 188 may relax the operation and allow one or more groups to operate at a higher electrical current consuming level.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", "subsequently", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for managing electrical current within a portable computing device ("PCD"), the method comprising:
   assigning a plurality of hardware elements of the PCD to one of two groups, wherein a first group of the two groups is a high priority group, and a second group of the two groups is a low priority group;
   monitoring individual electrical current levels of the first group;
   estimating an electrical current level of the second group;
   calculating an instantaneous electrical current level for the PCD based on a current charge status for the PCD;
   comparing the calculated instantaneous electrical current level to the monitored individual electrical current levels of the first group and the estimated electrical current level of the second group; and
   adjusting operation of at least one hardware element based on the comparison to keep operation of the PCD below the calculated instantaneous electrical current level for the PCD, wherein comparing the calculated instantaneous electrical current level to the monitored individual electrical current levels and estimated electrical current level further comprises comparing the calculated instantaneous electrical current level to the sum of the monitored individual electrical current levels of the first group and the estimated electrical current level of the second group.

2. The method of claim 1, wherein estimating an electrical current level for the second group further comprises estimating based on requests issued to hardware elements of the second group.

3. The method of claim 1, further comprising comparing the calculated instantaneous electrical current level to minimum current levels listed in a table, the table further comprising use cases for the PCD.

4. The method of claim 1, wherein adjusting operation of at least one hardware element further comprises issuing at least one command to the hardware element.

5. The method of claim 4, wherein the at least one command comprises one of a plurality of power consuming states for the hardware element.

6. The method of claim 1, wherein each of the first group and the second group has an assigned priority level.

7. The method of claim 1, wherein assigning a plurality of hardware elements of the PCD to one of two groups is made according to input received from an operator of the PCD.

8. The method of claim 1, wherein at least one hardware element comprises a multicore processor.

9. The method of claim 1, wherein each level of the first group and the second group has an assigned priority level.

10. A computer system for managing electrical current within a portable computing device ("PCD"), the system comprising:
    a processor configured to:
       assign a plurality of hardware elements of the PCD to one of two groups, wherein a first group of the two groups is a high priority group, and a second group of the two groups is a low priority group;
       monitor individual electrical current levels of the first group;
       estimate an electrical current level of the second group;
       calculate an instantaneous electrical current level for the PCD based on a current charge status for the PCD;
       compare the calculated instantaneous electrical current level to the monitored individual electrical current levels of the first group and the estimated electrical current level of the second group; and
       adjust operation of at least one hardware element based on the comparison to keep operation of the PCD below the calculated instantaneous electrical current level for the PCD, wherein the processor being configured to compare the calculated instantaneous electrical current level to the monitored individual electrical current levels of the first group and the estimated electrical current level of the second group further comprises the processor being configured to compare the calculated instantaneous electrical current level to the sum of the monitored individual electrical current levels of the first group and the estimated electrical current level of the second group.

11. The system of claim 10, wherein estimating the electrical current level for the second group further comprises estimating based on requests issued to hardware elements of the second group.

12. The system of claim 10, wherein the processor is further configured to:
    compare the calculated instantaneous electrical current level to minimum current levels listed in a table, the table further comprising use cases for the PCD.

13. The system of claim 10, wherein adjusting operation of at least one hardware element further comprises issuing at least one command to the hardware element.

14. The system of claim 13, wherein the at least one command comprises one of a plurality of power consuming states for the operation of the hardware element.

15. The system of claim 10, wherein each of the first group and the second group has an assigned priority level.

16. The system of claim 10, wherein assigning a plurality of hardware elements of the PCD to one of two groups is made according to input received from an operator of the PCD.

17. The system of claim 10, wherein at least one hardware element comprises a multicore processor.

18. The system of claim 10, wherein each level of the first group and the second group has an assigned priority level.

19. A computer system for managing one or more memory resources of a wireless handheld computing device, the system comprising:
   means for assigning a plurality of hardware elements of the PCD to one of two groups wherein a first group of the two groups is a high priority group, and a second group of the two groups is a low priority group;
   means for monitoring individual electrical current levels of the first group;
   means for estimating an electrical current level of the second group;
   means for calculating an instantaneous electrical current level for the PCD based on a current charge status for the PCD;
   means for comparing the calculated instantaneous electrical current level to the monitored individual electrical current levels of the first group and the estimated electrical current level of the second group; and
   means for adjusting operation of at least one hardware element based on the comparison to keep operation of the PCD below the calculated instantaneous electrical current level for the PCD, wherein the means for comparing the calculated instantaneous electrical current level to the monitored individual electrical current levels of the first group and the estimated electrical current level of the second group further comprises comparing the calculated instantaneous electrical current level to the sum of the monitored individual electrical current levels of the first group and the estimated current level of the second group.

20. The system of claim 19, wherein the means for estimating an electrical current level for the second group further comprises estimating based on requests issued to hardware elements of the second group.

21. The system of claim 19, further comprising:
   means for comparing the calculated instantaneous electrical current level to minimum current levels listed in a table, the table further comprising use cases for the PCD.

22. The system of claim 19, wherein the means for adjusting operation of at least one hardware element further comprises means for issuing at least one command to the hardware element.

23. The system of claim 22, wherein the at least one command comprises one of a plurality of power consuming states for the operation of the hardware element.

24. The system of claim 19, wherein each of the first group and the second group has an assigned priority level.

25. The system of claim 19, wherein the means for assigning a plurality of hardware elements of the PCD to one of two groups assesses input received from an operator of the PCD.

26. The system of claim 19, wherein at least one hardware element comprises a multicore processor.

27. The system of claim 19, wherein each level of the first group and the second group has an assigned priority level.

28. A computer program product comprising a computer usable device having a computer readable program code embodied therein, said computer readable program code adapted to be executed to implement a method for managing electrical current within a portable computing device ("PCD"), said method comprising:
   assigning a plurality of hardware elements of the PCD to one of two groups, wherein a first group of the two groups is a high priority group, and a second group of the two groups is a low priority group;
   monitoring individual electrical current levels of the first group;
   estimating an electrical current level of the second group;
   calculating an instantaneous electrical current level for the PCD based on a current charge status for the PCD;
   comparing the calculated instantaneous electrical current level to the monitored individual electrical current levels of the first group and the estimated electrical current level of the second group; and
   adjusting operation of at least one hardware element based on the comparison to keep operation of the PCD below the calculated instantaneous electrical current level for the PCD, wherein comparing the calculated instantaneous electrical current level to the monitored individual electrical current levels of the first group and the estimated electrical current level of the second group further comprises comparing the calculated instantaneous electrical current level to the sum of the monitored individual electrical current levels of the first group and the estimated electrical current level of the second group.

29. The computer program product of claim 28, wherein estimating the electrical current level for the second group further comprises estimating based on requests issued to hardware elements of the second group.

30. The computer program product of claim 28, wherein the program code implementing the method further comprises:
   comparing the calculated instantaneous electrical current level minimum current levels listed in a table, the table further comprising use cases for the PCD.

31. The computer program product of claim 28, wherein adjusting operation of at least one hardware element further comprises issuing at least one command to the hardware element.

32. The computer program product of claim 31, wherein the at least one command comprises one of a plurality of power consuming states for the operation of the hardware element.

33. The computer program product of claim 28, wherein each of the first group and the second group has an assigned priority level.

34. The computer program product of claim 28, wherein assigning a plurality of hardware elements of the PCD to one of two groups is made according to input received from an operator of the PCD.

35. The computer program product of claim 28, wherein at least one hardware element comprises a multicore processor.

36. The computer program product of claim 28, wherein each level of the first group and the second group has an assigned priority level.

* * * * *